US006990863B2

(12) United States Patent
Challoner et al.

(10) Patent No.: US 6,990,863 B2
(45) Date of Patent: *Jan. 31, 2006

(54) ISOLATED RESONATOR GYROSCOPE WITH ISOLATION TRIMMING USING A SECONDARY ELEMENT

(75) Inventors: A. Dorian Challoner, Manhattan Beach, CA (US); Kirill V. Shcheglov, Los Angeles, CA (US)

(73) Assignees: The Boeing Company, Chicago, IL (US); California Institute of Technology, Pasadena, CA (US)

(*) Notice: Subject to any disclaimer, the term of this patent is extended or adjusted under 35 U.S.C. 154(b) by 169 days.

This patent is subject to a terminal disclaimer.

(21) Appl. No.: 10/423,459

(22) Filed: Apr. 25, 2003

(65) Prior Publication Data

US 2003/0188577 A1 Oct. 9, 2003

Related U.S. Application Data

(63) Continuation-in-part of application No. 10/410,744, filed on Apr. 10, 2003, and a continuation-in-part of application No. 10/370,953, filed on Feb. 20, 2003, and a continuation-in-part of application No. 09/928,279, filed on Aug. 10, 2001, now Pat. No. 6,629,460.
(60) Provisional application No. 60/375,749, filed on Apr. 26, 2002.

(51) Int. Cl.
*G01N 9/04* (2006.01)

(52) U.S. Cl. .................................. 73/504.12; 73/504.14
(58) Field of Classification Search .............. 73/504.12, 73/504.14, 504.02
See application file for complete search history.

(56) References Cited

U.S. PATENT DOCUMENTS

| 392,650 A | 11/1888 | Watrous |
| 5,226,321 A | 7/1993 | Varnham et al. |
| 5,646,346 A | 7/1997 | Okada |

(Continued)

FOREIGN PATENT DOCUMENTS

| DE | 44 42 033 A1 | 5/1996 |
| WO | WO 96/38710 | 12/1996 |
| WO | WO 98/15799 | 4/1998 |

OTHER PUBLICATIONS

D. Wright et al, "The HRG Applied to a Satellite Attitude Reference System," Guidance and Control, American Astronautical Society, Advances in Astronautical Sciences, 1994, 1994, 86:1–13.

M.W. Putty et al., "A Micromachined Vibrating Ring Gyroscope," Solid State Sensor and Acruator Workshop, Transducer Research Foundation, Hilton Head, 1994, pp. 213–220.

(Continued)

*Primary Examiner*—John E. Chapman
(74) *Attorney, Agent, or Firm*—Patent Venture Group

(57) ABSTRACT

The present invention discloses a resonator gyroscope including an isolated resonator. One or more flexures support the isolated resonator and a baseplate is affixed to the resonator by the flexures. Drive and sense elements are affixed to the baseplate and used to excite the resonator and sense movement of the gyroscope. In addition, at least one secondary element (e.g., another electrode) is affixed to the baseplate and used for trimming isolation of the resonator. The resonator operates such that it transfers substantially no net momentum to the baseplate when the resonator is excited. Typically, the isolated resonator comprises a proof mass and a counterbalancing plate.

26 Claims, 10 Drawing Sheets

U.S. PATENT DOCUMENTS

| | | | |
|---|---|---|---|
| 5,665,915 | A | 9/1997 | Kobayashi et al. |
| 5,783,749 | A | 7/1998 | Lee et al. |
| 5,894,090 | A | 4/1999 | Tang et al. |
| 5,905,202 | A | 5/1999 | Kubena et al. |
| 5,920,012 | A | 7/1999 | Pinson |
| 6,009,751 | A | 1/2000 | Ljung |
| 6,044,705 | A | 4/2000 | Neukermans et al. |
| 6,164,134 | A | 12/2000 | Cargille |
| 6,282,958 | B1 | 9/2001 | Fell et al. |
| 6,289,733 | B1 | 9/2001 | Challoner et al. |
| 6,367,786 | B1 | 4/2002 | Gutierrez et al. |
| 6,515,278 | B2 | 2/2003 | Wine et al. |
| 6,629,460 | B2 * | 10/2003 | Challoner ............... 73/504.02 |

OTHER PUBLICATIONS

T.K. Tang et al., "Silicon Bulk Micromachined Vibratory Gyroscope," Solid State Sensor and Actuator Workshop, Transducer Research Foundation, Hilton Head, South Carolina, Jun. 2–6, 1996, 6 pgs.

N. Barbour et al., "Micromechanical Silicon Instrument and Systems Development at Draper Laboratory," AIAA Guidance Navigation and Control Conference, American Institute of Aeronautics and Astronautics, San Diego, CA, Jul. 29–31, 1996, Paper No. 96–3709, pp. 1–7.

J.D. Johnson et al., "Surface Micromachined Angular Rate Sensor," A1995 SAE Conference, Paper No. 950538, pp. 77–83.

* cited by examiner

```
                                                    300
                                                    ↙

┌─────────────────────────────────────────┐
   │  Provide an isolated resonator wherein the │ ─── 302
   │  resonator transfers substantially no net  │
   │  momentum to a baseplate when the resonator is │
   │                  excited.                  │
   └─────────────────────────────────────────┘
                        │
                        ▼
   ┌─────────────────────────────────────────┐
   │  Support the isolated resonator with one or more │ ─── 304
   │                  flexures.                 │
   └─────────────────────────────────────────┘
                        │
                        ▼
   ┌─────────────────────────────────────────┐
   │  Affix drive and sense electrodes to the baseplate │ ─── 306
   │  for exciting the resonator and sensing movement │
   │              of the gyroscope.             │
   └─────────────────────────────────────────┘
                        │
                        ▼
   ┌─────────────────────────────────────────┐
   │  Affix at least one secondary element to the base │ ─── 308
   │    plate for trimming isolation of the resonator.  │
   └─────────────────────────────────────────┘
                        │
                        ▼
   ┌─────────────────────────────────────────┐
   │  Affix the baseplate to the resonator by the one or │ ─── 310
   │                more flexures.              │
   └─────────────────────────────────────────┘
```

*FIG. 3*

Output Set: Mode 10, 2868.904 Hz
Contour: R2 Rotation

ISOLATED RESONATOR GYROSCOPE WITH ISOLATION TRIMMING USING A SECONDARY ELEMENT

CROSS-REFERENCE TO RELATED APPLICATIONS

This application claims the benefit under 35 U.S.C. §119 of the following co-pending U.S. provisional patent application, which is incorporated by reference herein:

U.S. Provisional Patent Application No. 60/375,749, by Ken Hayworth et al., filed Apr. 26, 2002, and entitled "ELECTROSTATIC SPRING SOFTENING APPLIED TO ADJUSTING MECHANICAL MODAL FREQUENCIES (AND AXES) AND MECHANICAL QUALITY (Q) FACTOR (AND DAMPENING AXES) IN REDUNDANT DEGREE OF FREEDOM RESONATORS".

This continuation-in-part application claims the benefit under 35 U.S.C. §120 of the following U.S. utility patent applications, which are all incorporated by reference herein:

U.S. patent application No. 09/928,279, by A. Dorian Challoner, filed Aug. 10, 2001 and entitled "ISOLATED RESONATOR GYROSCOPE", now issued as U.S. Pat. No. 6,629,460;

U.S. patent application Ser. No. 10/370,953 by A. Dorian Challoner et al., filed Feb. 20, 2003 and entitled "ISOLATED RESONATOR GYROSCOPE WITH A DRIVE AND SENSE PLATE"; and U.S. patent application No. 10/410,744, by A. Dorian Challoner et at, filed Apr. 10, 2003, and entitled "ISOLATED RESONATOR GYROSCOPE WITH COMPACT FLEXURES".

STATEMENT OF GOVERNMENT RIGHTS

The invention described herein was made in the performance of work under a NASA contract, and is subject to the provisions of Public Law 96-517 (35 U.S.C. 202) in which the Contractor has elected to retain title.

BACKGROUND OF THE INVENTION

1. Field of the Invention

The present invention relates to gyroscopes, and in particular to improved resonator microgyroscopes and their manufacture. More particularly, this invention relates to producing and tuning microgyroscopes, and particularly, isolated resonator gyroscopes.

2. Description of the Related Art

Gyroscopes are used to determine direction based upon the sensed inertial reaction of a moving mass. In various forms they are often employed as a critical sensor for vehicles such as aircraft and spacecraft. They are generally useful for navigation or whenever it is necessary to autonomously determine the orientation of a free object.

Older conventional gyroscopes were very heavy mechanisms, employing relatively large spinning masses by current standards. A number of recent technologies have brought new forms of gyroscopes, including optical gyroscopes such as laser gyroscopes and fiberoptic gyroscopes as well as vibratory gyroscopes.

Spacecraft generally depend on inertial rate sensing equipment to supplement attitude control. Currently this is often performed with expensive conventional spinning mass gyros (e.g., a Kearfott inertial reference unit) or conventionally-machined hemispherical resonator gyroscopes (e.g. a Litton hemispheric resonator gyroscope inertial reference unit). However, both of these are very expensive, large and heavy.

In addition, although some prior symmetric vibratory gyroscopes have been produced, their vibratory momentum is transferred directly to their baseplates or packages. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. which describes a symmetric cloverleaf vibratory gyroscope design and is hereby incorporated by reference herein. Other planar tuning fork gyroscopes may achieve a degree of isolation of the vibration from the baseplate, however these gyroscopes lack the vibrational symmetry desirable for tuned operation.

In addition, shell mode gyroscopes, such as the hemispherical resonator gyroscope and the vibrating ring gyroscope, are known to have some desirable isolation and vibrational symmetry attributes, however, these designs are not suitable for or have significant limitations with thin planar silicon microfabrication. The hemispherical resonator employs the extensive cylindrical sides of the hemisphere for sensitive electrostatic sensors and effective actuators, however its high aspect ratio, 3D curved geometry is unsuitable for inexpensive thin planar silicon microfabrication. The thin ring gyroscope while suitable for planar silicon microfabrication lacks electrostatic sensor and actuators that take advantage of the extensive planar area of the device.

Vibration isolation using a low-frequency seismic support is also known (e.g., U.S. Pat. No. 6,009,751, which is incorporated by reference herein), however such increased isolation comes at the expense of proportionately heavier seismic mass and/or lower support frequency. Both effects are undesirable for compact tactical inertial measurement unit (IMU) applications.

Furthermore, the scale of previous silicon microgyroscopes (e.g., U.S. Pat. No. 5,894,090) has not been optimized for navigation grade performance resulting in higher noise and drift than desired. This problem stems from a use of thin epitaxially grown silicon flexures to define critical vibration frequencies that are limited to 0.1% thickness accuracy. Consequently device sizes are limited to a few millimeters. Such designs exhibit high drift due to vibrational asymmetry or unbalance and high rate noise due to lower mass which increases thermal mechanical noise and lower capacitance sensor area which increases rate errors sensor electronics noise.

Scaling up of non-isolated silicon microgyros is also problematic because external energy losses will increase with no improvement in resonator Q and no reduction in case-sensitive drift. An isolated cm-scale resonator with many orders of magnitude improvement in 3D manufacturing precision is required for navigation grade performance.

Conventionally machined navigation grade resonators such as in hemispherical or shell gyros have the optimum scale, e.g. 30 mm and 3D manufacturing precision and hence desirable drift and noise performance, however such gyros are expensive and slow to manufacture. Conventional laser trimming of mechanical resonators can further improve manufacturing precision to some degree, however this process is not suitable for microgyros with narrow mechanical gaps and has limited resolution, necessitating larger electrostatic bias adjustments in the final tuning process.

There is a need in the art for small gyroscopes with greatly improved performance for navigation and spacecraft payload pointing. There is also a need for such gyros to be cheaper and more easily manufactured with greater 3D mechanical precision. There is still further a need for such gyros to have desirable isolation and vibrational symmetry attributes while being compatible with planar silicon manufacturing. Finally, there is a need for such gyros to have robust designs, easily tunable and capable of selective control of differential rocking modes and balance control. The present invention satisfies all these needs.

SUMMARY OF THE INVENTION

The present invention provides an affordable vibratory gyroscope with navigation grade performance by means of a precision isolated symmetric planar resonator of optimum scale that can be fabricated with silicon photolithography from commercial double-side polished silicon wafers with low total thickness variation.

The present invention provides an isolated resonator comprising two bodies with transverse inertia symmetry about an axis aligned with an input axis and elastically supported so that their axes of symmetry and centers of mass coincide and together form two differential rocking modes of vibration transverse to the axis of symmetry. The two bodies are supported on a baseplate having an inertial rate input axis and exhibit substantially equal frequencies distinct from other modes of vibration, mutually orthogonal and imparting substantially zero net momentum to the baseplate. Primary (drive and sense) electrodes are disposed below the resonator on the supporting baseplate structure to excite and sense movement of the resonator.

In the detailed embodiments which follow, a first one of the bodies is a proof mass, a second one of the bodies is a counterbalancing plate. The counterbalancing plate is for reacting with the drive and sense electrodes. Other equivalent structures and arrangements will be readily apparent to those skilled in the art.

In one exemplary embodiment, the drive and sense electrodes are disposed below the counterbalancing plate. The drive electrodes are aligned to drive a first one of the differential rocking modes to vibrate. The sense electrodes are aligned to sense the motion of the second differential rocking mode induced by Coriolis accelerations resulting from the inertial rate input and internally driven differential rocking motion about the first mode axis.

A key element of the present invention is the incorporation of at least one secondary element (e.g., an additional electrode) which can be used to improve isolation of the resonator from the baseplate. Typically, the secondary element can be implemented as an electrode below a support plate portion of the resonator which supports the vertical portion of the proof mass. The addition of an inner electrode plate permits selective control of the differential rocking mode and electrostatic balance control. In addition to isolated resonator gyros, the secondary element is also applicable to other types of vibratory gyroscopes, such as hemispherical resonator gyroscopes.

A typical embodiment of the present invention comprises a resonator gyroscope including an isolated resonator. The resonator operates such that it transfers substantially no net momentum to the baseplate when the resonator is excited. Typically, the isolated resonator comprises a proof mass and counterbalancing plate. One or more flexures support the isolated resonator and a baseplate is affixed to the resonator by the flexures. Drive and sense electrodes are affixed to the baseplate and used to excite the resonator and sense movement of the gyroscope. In addition, at least one secondary element is affixed to the baseplate and used for trimming isolation of the resonator.

BRIEF DESCRIPTION OF THE DRAWINGS

Referring now to the drawings in which like reference numbers represent corresponding parts throughout:

FIG. 3 is a flowchart of a typical method of using the invention;

DETAILED DESCRIPTION INCLUDING PREFERRED EMBODIMENTS

Figure 1:
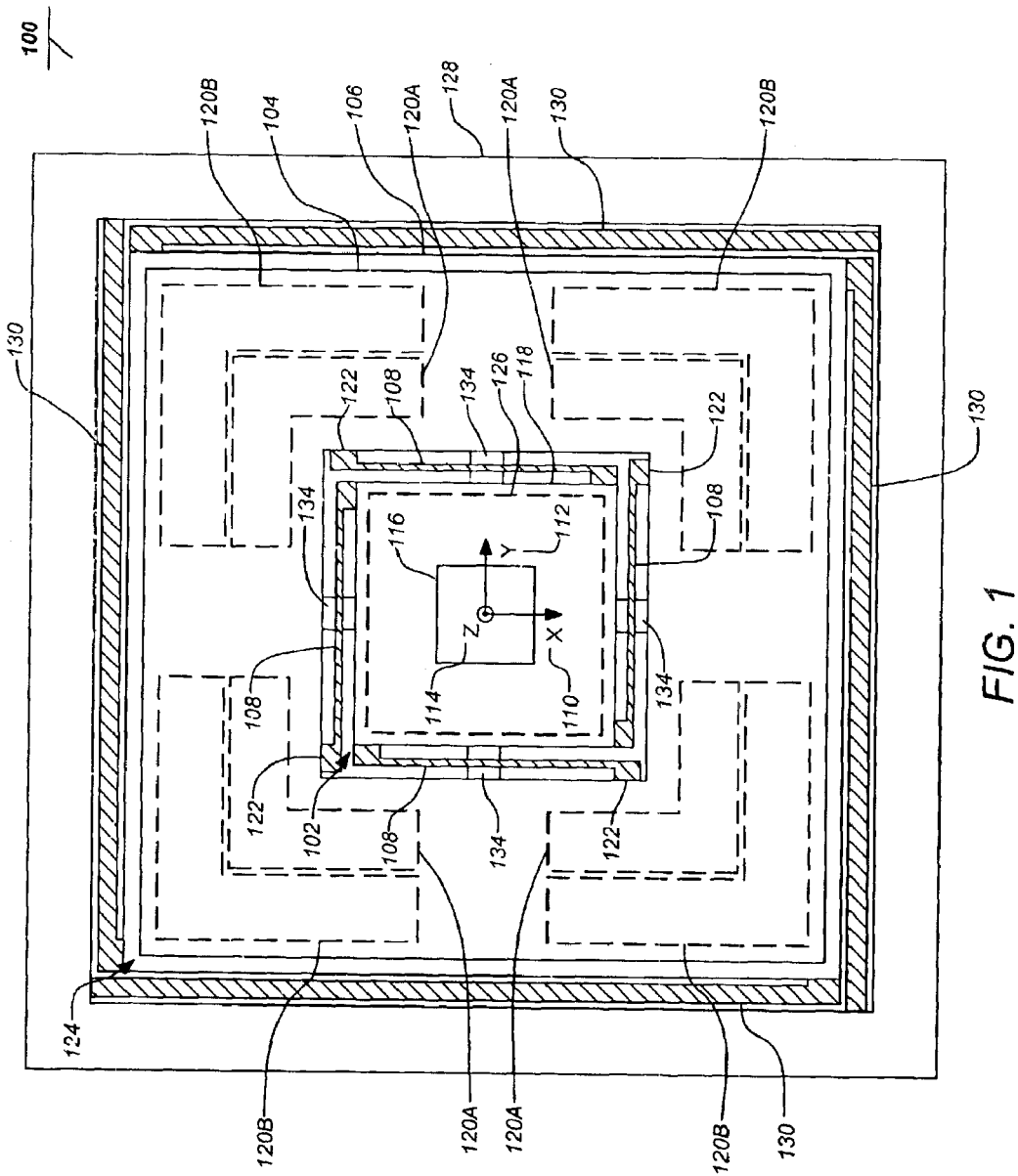
FIG. 1 depicts a top view of an exemplary reactionless resonator gyroscope of the present invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

1.0 Overview

Embodiments of the present invention generally describe a systematically designed isolated planar vibratory gyroscope that provides a desired differential rocking mode vibration of a counterbalancing plate versus a central elongated proof mass, while ensuring that the undesirable common rocking mode frequency is practically separated above the desirable differential mode frequency. Embodiments of the invention include isolation that can be simply achieved by adjusting the elongated proof mass (i.e., post) length. The inertias of the proof mass and counterbalancing plate do not have to be as precisely equal.

Further embodiments of the invention also provide integral vibration isolation to the baseplate through additional baseplate isolation flexures, attaching the baseplate to a mounting plate to further improve resonator isolation.

Importantly, embodiments of the invention include a secondary element (e.g., an inner electrode plate) for electrostatic balancing or trimming of the isolation of the differential rocking mode from the baseplate and outer mounting plate. In a typical embodiment, the secondary element is affixed to the baseplate disposed below a plate portion of a central proof mass. The secondary element, in conjunction with the primary element (e.g., the drive and sense electrodes), permits selective electrostatic control of the differential rocking mode of the gyroscope. In addition, the use of the secondary element can be applied to isolated resonator gyroscopes beyond those employing a central proof mass and counterbalancing plate as described herein.

Typical embodiments of the present invention also use the counterbalancing plate to react with the sense and drive electrodes, disposed proximate to the counterbalancing plate beneath it. Thus, the counterbalancing plate serves a dual role, forming an isolated resonator with the proof mass and providing a surface for reaction with the drive and sense electrodes. In addition, to enhance the operation of the gyroscope, the counterbalancing plate can be structured with extensive planar surface regions to better support electrostatic operation with the drive and sense electrodes.

All of the moving elements critical to performance can be photolithographically machined with 3D precision from a single double-side polished silicon wafer. The precise planar construction, large planar areas for electrostatic sense and control and favorable mass distribution provide symmetric rocking motion for sensitive tuned vibratory gyroscope operation with ideal mechanical isolation from external disturbances.

Embodiments of the invention generally comprise an all-silicon, isolated symmetric vibratory gyroscope that is inexpensive to produce using photolithography and that can be scaled large enough (e.g., approximately 20 mm resonator) to achieve the required performance. Combined with low-cost, closed-loop, analog control electronics, a complete redundant inertial reference unit can be inexpensively manufactured, even when produced in small quantities. Further, when combined with a low-power digital control electronics application-specific integrated circuit (ASIC) for much larger quantities, a "golf ball" sized inertial navigation unit can be produced. Such a compact, lightweight and inexpensive precision inertial reference unit can find a wide range of applications in military as well as commercial products.

2.0 Exemplary Resonator Gyroscope Embodiment

FIG. 1 depicts a top view of a reactionless resonator gyroscope 100 embodiment of the present invention. The gyroscope 100 comprises a baseplate 106 and a unique resonator 124 which includes a post inertial proof mass 102 and a counterbalancing plate 104. The counterbalancing plate 104 has a rocking inertia substantially comparable to that of the inertial proof mass 102 and these two bodies are interconnected and interact as described above. The counterbalancing plate 104 and central proof mass 102 are coupled to the baseplate 106 at four mounting points 134 and interconnected to each other by way of flexures 108. The principal axes of concern which will be referenced throughout the specification are the X axis 110, the Y axis 112 and the Z axis 114 (which is directed out of the page of FIG. 1). Alternately, the counterbalancing plate 104 can also designed in any other shape, such as a circular ring or other arbitrary shape so long as the two bodies (inertial proof mass 102 and counterbalancing plate 104) interact as previously described.

Figure 2:
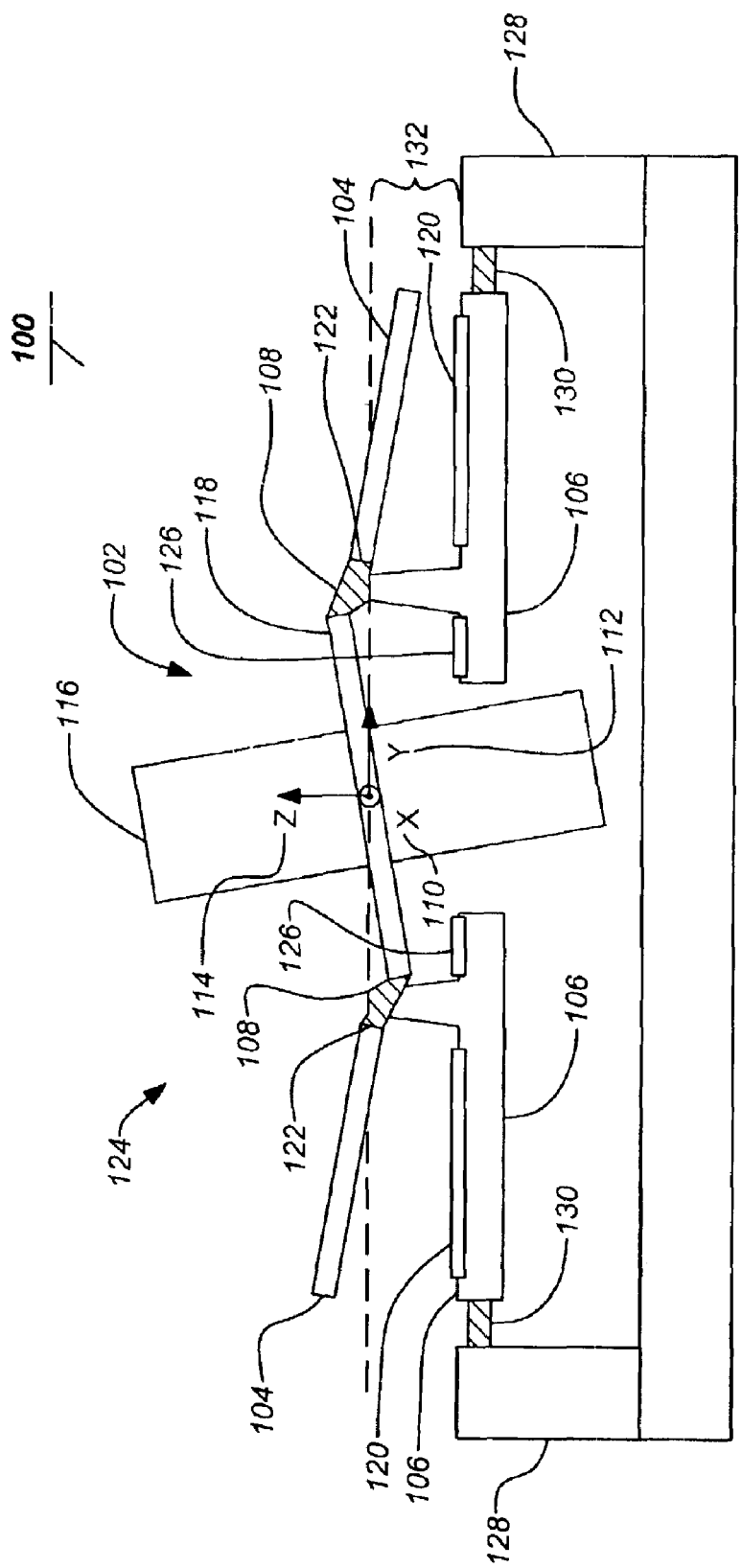
FIG. 2 depicts a side view of the exemplary reactionless resonator gyroscope of the present invention in an exaggerated displaced position.

FIG. 2 depicts a side view of a reactionless resonator gyroscope 100 of the present invention in a displaced position. The gyroscope is shown displaced about the X axis 110. The mechanical assembly comprises a central inertial proof mass 102 element interconnected to an outer counterbalancing plate 104 and affixed to a baseplate 102 via elastic beam flexures 108 attached at the four mounting points 134. In one embodiment, the counterbalancing plate 104, flexures 108 and support plate 118 for the central inertial proof mass 102 can be photolithographically etched-through from the same double-side polished crystal silicon wafer to produce precision planar resonator gyroscope.

The axisymmetric resonator 124 is coupled to a baseplate 106 such that the axisymmetric counterbalancing plate 104 can freely vibrate against the axisymmetric central proof mass 102 with counterbalanced oscillatory rocking motion and results in a distinct differential rocking mode with substantially no momentum transfer to or net reaction on the baseplate 106.

The proof mass 102 can be constructed in various forms, however the inertial distribution of the central proof mass is designed to have significantly more mass out of plane than in plane and hence high angular gain, or Coriolis reaction to inertial rate input with driven rocking motion of the resonator 124. To achieve this, the proof mass 102 comprises a vertical post portion 116 (elongated along the Z axis 114). The post portion 116 is disposed on a small central support plate portion 118 (in the X-Y plane). The post portion 116 and support plate portion 118 can be formed together from a thick silicon wafer for manufacturing ease as previously mentioned. Alternately, the proof mass 102 can be bonded as a separable central post portion 116 to the support plate portion 118 of the counterbalancing plate 104 formed from a thin silicon wafer.

By comparison to the present invention, previous vibratory gyroscopes with isolated resonators have relied on expensive conventional 3D machining and assembly to achieve marginal isolation. For example, hemispherical resonator gyroscopes employ low-frequency isolation techniques to gain a degree of isolation at the expense of increasing seismic suspension mass and increased deflections due to gravity loads. Asymmetric tuning fork vibratory gyroscopes provide isolation about the drive axis only and are subject to external disturbance about the output sense axis. The original cloverleaf microgyroscope (e.g., U.S. Pat. No. 5,894,090 to Tang et al.) was subject to external disturbances about its drive and output axes.

As further detailed hereafter, electrostatic driving and sensing can be implemented with the drive and sense electrodes 120A, 120B (collectively referred to as electrodes 120) affixed to the baseplate 106 beneath the large planar surfaces of the counterbalancing plate 104. See FIG. 1. The large surface area of the counterbalancing plate 104 is used to react with the driving and sensing electrodes 120. In general, the extensive planar electrode 120 regions are formed on the baseplate 106 beneath the counterbalancing plate 104. The counterbalancing plate 104 structure extends toward the central proof mass 102 with the flexures 108 arranged around a perimeter of the central proof mass 102 as shown in FIG. 1 to maximize the useful electrostatic reacting area. Thus, the gap between the proof mass 102 and the counterbalancing plate 104 is reduced and the counterbalancing plate 104 obtains a more plate-like configuration.

Also as shown in FIG. 1, a typical arrangement of the drive and sense electrodes 120A, 120B is for the drive electrodes 120A to be disposed nearer to the proof mass 102 than the sense electrodes 120B; one drive electrode 120A and one sense electrode 120B each are disposed on the baseplate 106 under each quarter segment of the counterbalancing plate 104. This improves the overall sensitivity of the microgyro 100 as the sense electrodes 120B obtain a larger surface area and the gaps around the periphery of the counterbalancing plate 104 undergo larger displacements relative to the baseplate 106. Other electrode 120 patterns can also be used as well, however. For example, the electrodes 120 can be interwoven.

In addition, to allow greater planar area of the counterbalancing plate for the drive and sense electrodes, the flexures 108 can be supported by the baseplate 106 off-center. As shown in FIG. 1, the baseplate 106 supports the flexures 108 at points nearer to the proof mass 102 than the attachment points 122 to the counterbalancing plate 104.

2.1 Isolation Trimming Using a Secondary Element

All vibratory gyroscopes employ a rotation sensing mechanical element which is driven to oscillate in a first mode, i.e. the input or drive mode. A Coriolis acceleration of the element under rotation induces energy transfer from the input mode to a second mode, i.e. the output or sense mode. The second mode produces an excitation in the sense element which is then detected. Optimum performance of a vibratory gyroscope is obtained when the drive and sense modes have the same resonant frequency and a high Q factor. The response to the Coriolis acceleration is then mechanically amplified by the Q factor of the resonance and provides improved sensor performance. Closed loop control of the resonator sense mode (e.g. U.S. Pat. No. 6,360,601, which is hereby incorporated by reference herein) provides Coriolis force-rebalance, sense mode damping and wide gyroscope bandwidth.

Embodiments of the present invention use bias trimming to modify the overall modal stiffness with one or more secondary elements 126 (e.g., additional electrodes or other suitable driving means), affixed to the baseplate 106 beneath the resonator 124 as shown in FIG. 1. The secondary element 126 is employed to drive the resonator 124 separately from the drive and sense electrodes 120A, 120B located affixed to the baseplate 106 beneath the counterbalancing plate 104. Thus, a secondary element 126 can be used to maintain this isolation and tuning after vacuum packaging and at varying temperatures throughout the life of the gyroscope.

In typical embodiments, the secondary element 126 applies electrostatic balancing or trimming of the isolation of the differential rocking mode from the baseplate 106 (and outer mounting plate 128, discussed hereafter). In a typical embodiment, the secondary element 126 is disposed beneath the support plate portion 118 of a central proof mass 102. Thus, the secondary element also affords independent control of one body (the proof mass 102) from the other body (the counterbalancing plate 104). The secondary element 126, operated in conjunction with the primary element (i.e., the drive and sense electrodes 120A, 120B beneath the counterbalancing plate 104), permits selective electrostatic control of the differential rocking mode of the gyroscope 100. It should be noted that the use of the secondary element 126 can be applied to other isolated resonator gyroscopes, beyond those employing a central proof mass 102 and counterbalancing plate 104 as detailed herein.

2.2 Integral Baseplate Isolation

The baseplate 106 may be a relatively thick silicon plate of rigid material. Such a thick rigid baseplate 106 can be directly bonded to the remainder of the gyroscope in a vacuum package. Alternatively, a more flexible thin baseplate 106 may be used to reduce cost and ease assembly with standard wafer processing equipment. Common elasticity in the resonator flexures 108 such as in the attachment to the baseplate 106 and finite inertia of the baseplate provides inherent separation of the differential rocking mode frequency from the common rocking mode of vibration. The singular attribute of any of these arrangements is that any external motion of the gyroscope package cannot excite differential rocking motion of the resonator, unless such motion is first internally driven and only then by virtue of Coriolis accelerations due to rotation of the gyroscope about the input axis or axis of inertial symmetry.

Furthermore, embodiments of the present invention can also incorporate integral vibration isolation to the baseplate 106 to further improve differential and common rocking mode frequency separation and vibration isolation of the resonator 124. In these embodiments, a mounting frame 128 is attached to the baseplate 106 through one or more isolation flexures 130. In this case, the baseplate 106 isolation of the resonator 124 is primarily considered with respect to the mounting frame 128 with the baseplate 106 serving as an additional isolating element. For example, the baseplate 106 isolation flexure 130 width and/or length can be set to attenuate axial or rocking vibrations above 500 Hz from the case. In the embodiment shown in FIGS. 1 and 2 the isolating flexures 130 extend around a perimeter of the baseplate 106, attached to the baseplate 106 at a first end and the mounting frame 128 at a second end (illustrating flexures extending around a perimeter as described above). As previously discussed with respect to the resonator flexures 108, radial flexure layouts and hybrids can similarly be used for the isolation flexures 130.

3.0 Producing an Isolated Resonator Gyroscope

FIG. 3 is a flowchart of a typical method 300 of producing an isolated resonator gyroscope of the invention. The method comprises providing an isolated resonator at block 302, wherein the isolated resonator 124 transfers substantially no net momentum to a baseplate 106 when the resonator 124 is excited. Next at block 304, the isolated resonator 124 is supported with one or more flexures 108. Drive and sense electrodes 120A, 120B for exciting the resonator 124 and sensing movement of the gyroscope 100 are affixed to the baseplate 106 at block 306. At block 308, at least one secondary element 126 for trimming isolation of the resonator 124 is affixed to the baseplate. Finally at block 310, the baseplate 106 is affixed to the resonator 124 by the flexures 108.

Providing the isolated resonator 124 may comprise etching the entire proof mass 102 and counterbalancing plate 104 from a single double-side polished crystal silicon wafer or etching only a plate portion 118 and the counterbalancing plate 104 from the silicon and bonding on a separate vertical portion 116 of the proof mass 102. A gold-gold thermocompression bond for a silicon post or anodic bond for a pyrex post can be used with critical precision bonding surfaces and dimensions defined by planar polishing.

The baseplate 106 is also preferably etched from a silicon wafer with standard semiconductor processing. Since the baseplate 106 does not move substantially, by virtue of the disclosed resonator isolation technique, its mechanical precision is of less importance.

4.0 Isolated Resonator Gyroscope Finite Element Model

Figure 4:
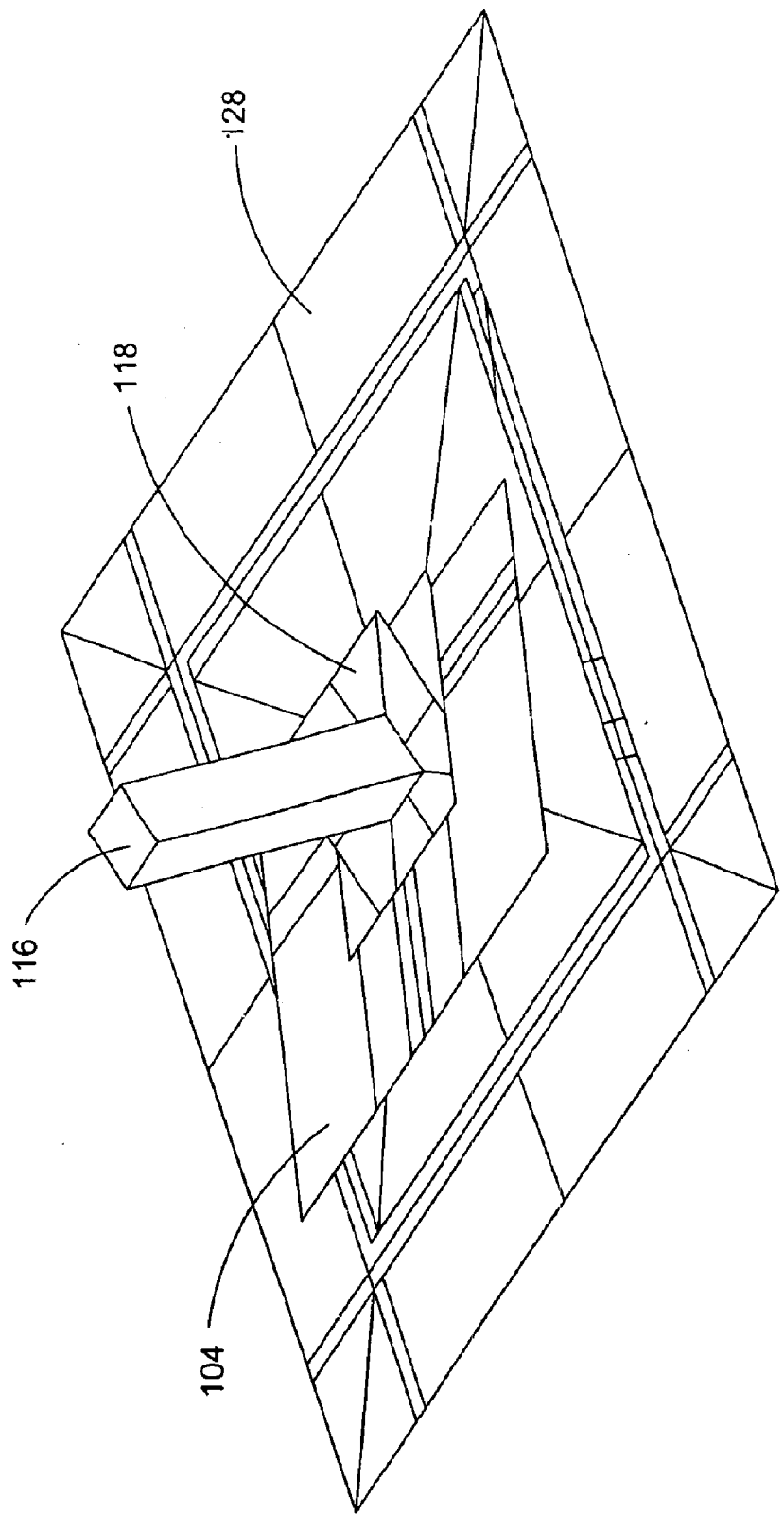
FIG. 4 illustrates an isometric view of an exemplary reactionless planar resonator gyroscope model in an exaggerated displaced position.
Figure 5:
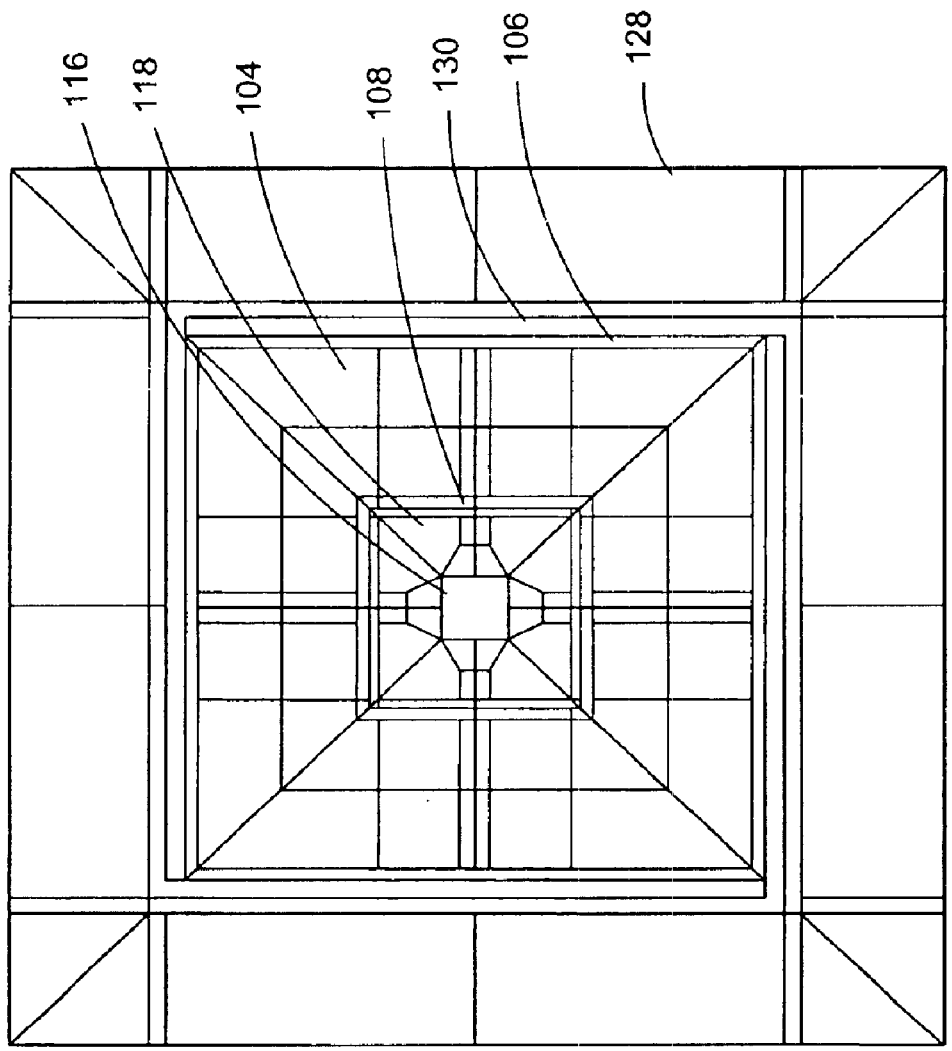
FIG. 5 illustrates a plan view of an exemplary reactionless planar resonator gyroscope model.
Figure 6:
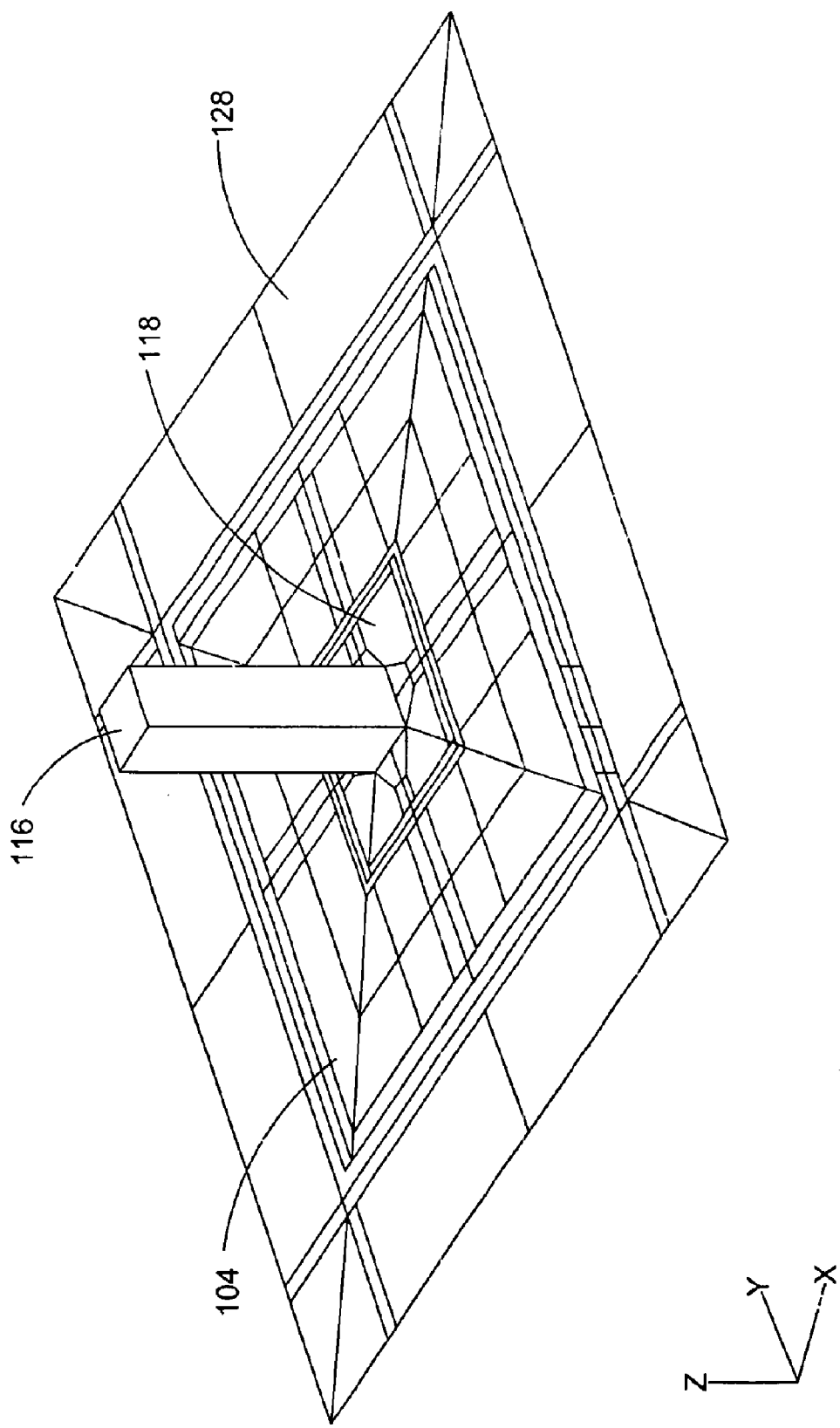
FIG. 6 illustrates an isometric view of an exemplary reactionless planar resonator gyroscope model.
Figure 7:
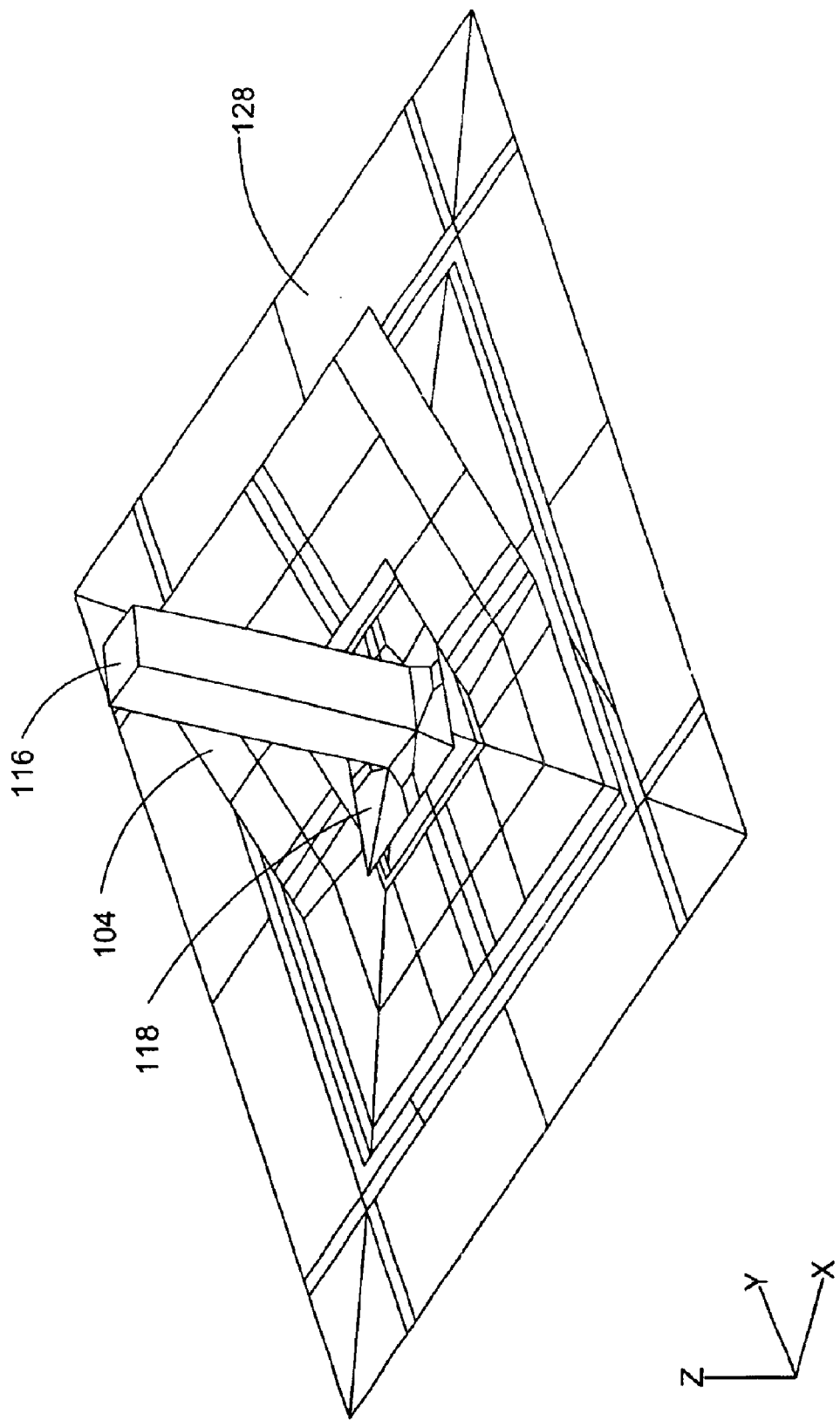
FIG. 7 illustrates a differential rocking mode about the X axis for an exemplary reactionless planar resonator gyroscope model.
Figure 8:
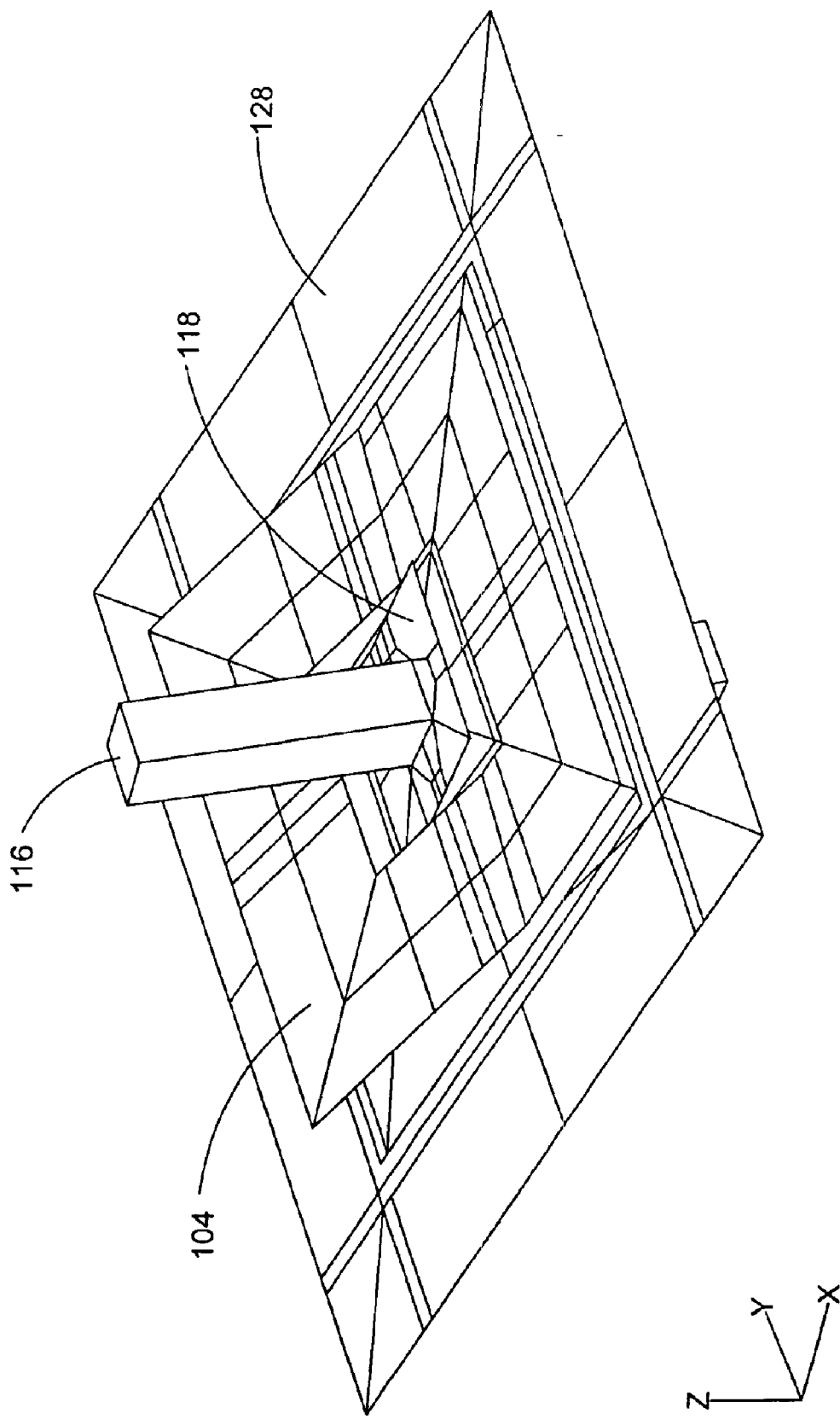
FIG. 8 illustrates a differential rocking mode about the Y axis for an exemplary reactionless planar resonator gyroscope model.

FIGS. 4–8 illustrate an isolated planar resonator gyroscope finite element model shown in different views and different modes. FIGS. 4–6 show the basic finite element model with graded contours and FIGS. 7 and 8 further illustrate rocking modes (about X and Y axes, respectively). The model employs a 2 cm length proof mass 102 post rocking against a 2 cm square counterbalancing plate 104, both attached via beam flexures 108 to a baseplate 106. The baseplate 106 is in turn attached via additional isolation flexures 130 to a mounting plate 128. To illustrate isolation effectiveness there are no mounting constraints applied to the model. Note that rocking modes depicted in FIGS. 4, 7 and 8 are shown with a highly exaggerated deflection. Beam flexures 108, 130 shown in all FIGS. 4–8 are depicted in line form for clarity.

The elements and effective rocking mode operation of an isolated planar resonator gyroscope 100 are shown in FIGS. 7 and 8. The mechanical assembly comprises a resonator 124 and baseplate 106. The resonator 124 comprises a central inertial proof mass 102 (including a vertical portion 116 attached to a support plate portion 118) and a counterbalancing plate 104 via elastic beam flexures 108. These beam flexures 108 also attach the resonator 124 to the baseplate 106. The silicon baseplate 106 comprises deposited metal electrodes (e.g., the drive and sense electrodes 120A, 120B and the secondary element 126) beneath the resonator. The baseplate 106 is attached to an outer mounting plate 128 with integral isolation flexures 130 connecting the two.

Figure 9:
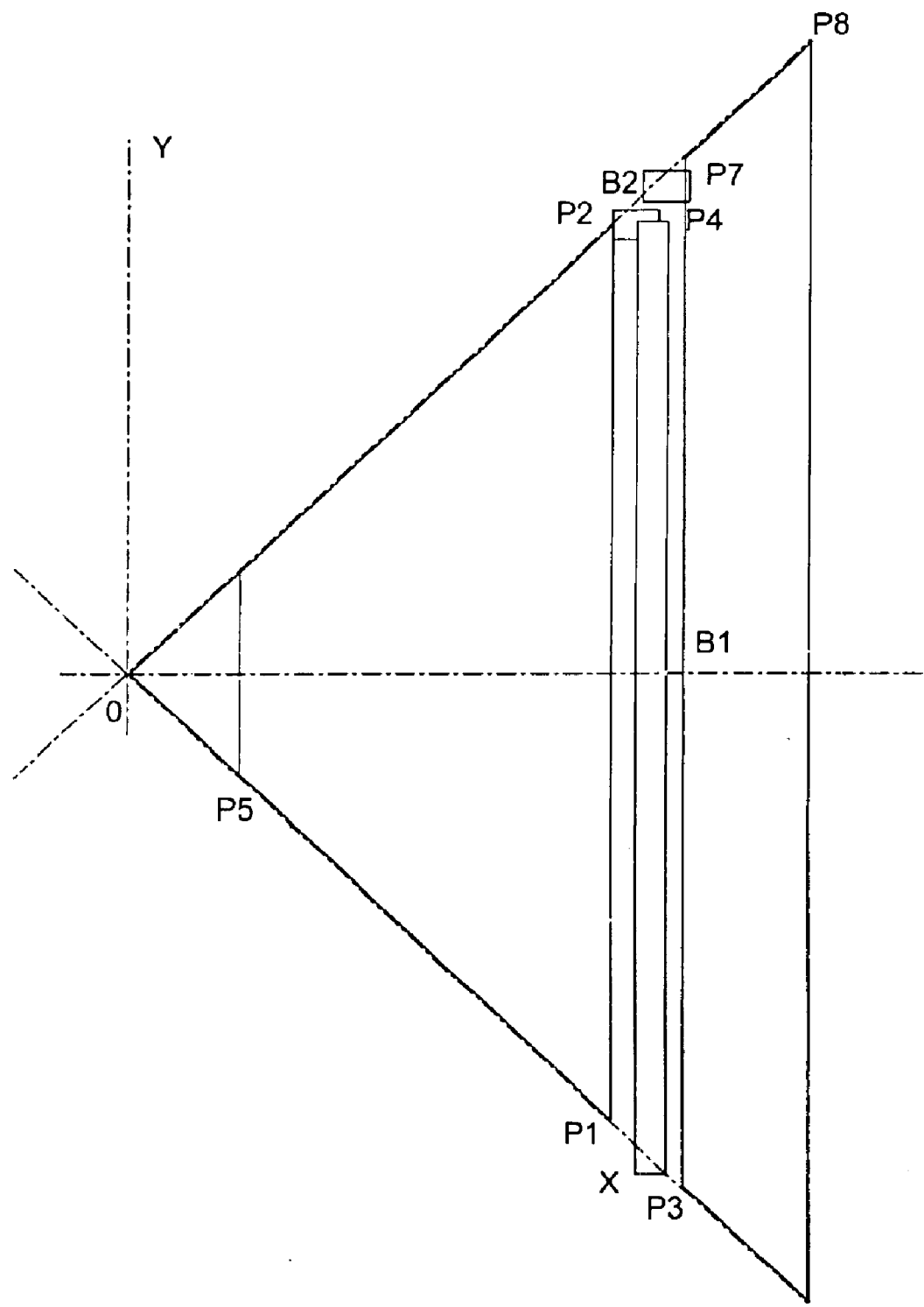
FIG. 9 illustrates baseplate geometry for an exemplary reactionless planar resonator gyroscope model.
Figure 10:
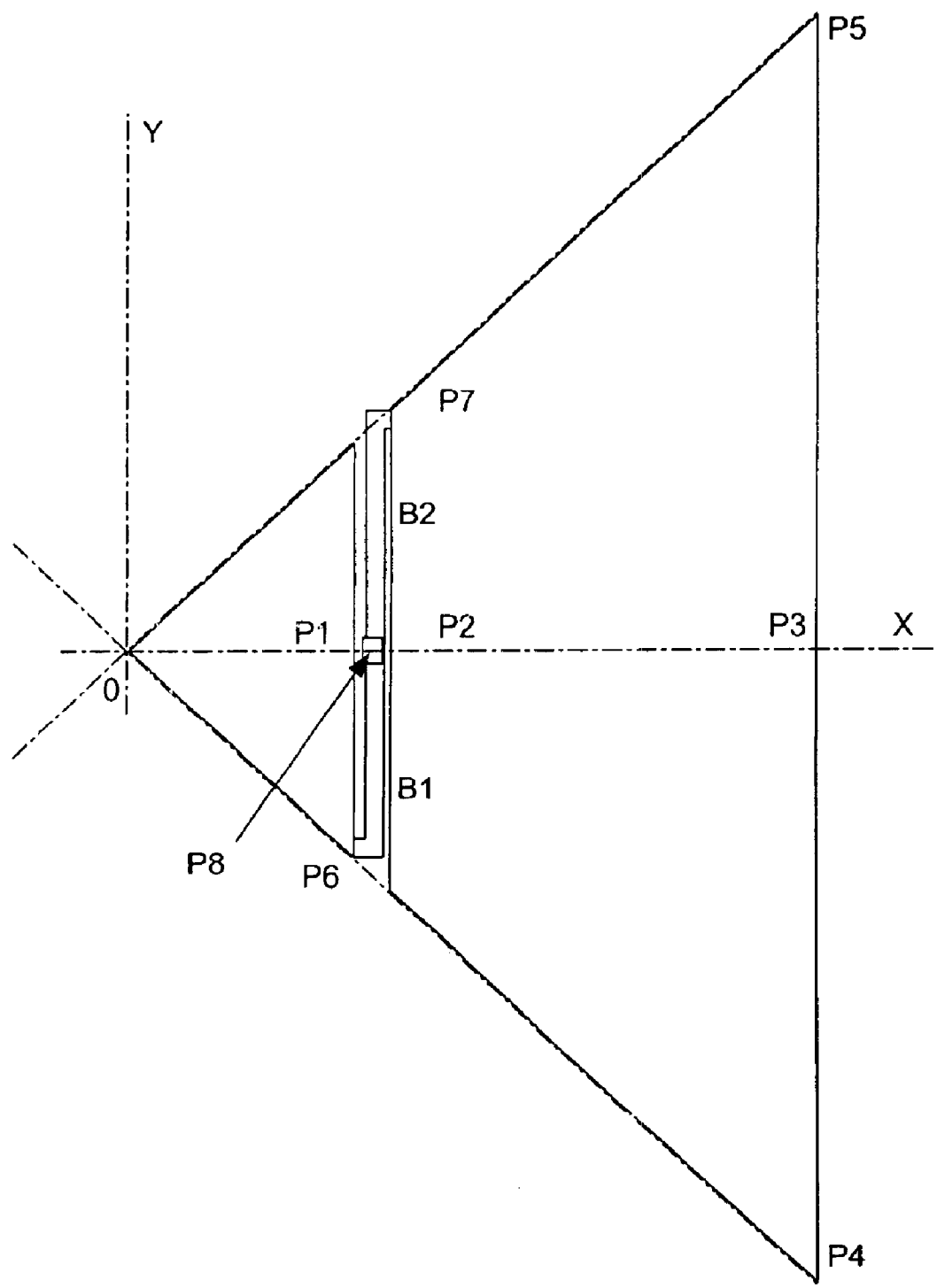
FIG. 10 illustrates resonator geometry for an exemplary reactionless planar resonator gyroscope model.

FIGS. 9 and 10 illustrate baseplate and resonator geometry, respectively, for an exemplary reactionless planar resonator gyroscope model. The following two tables provide point position and dimension data for the baseplate model described in FIG. 9. The model is for a thin baseplate (e.g., 600 micron).

| Point | P1 | P2 | P3 | P4 | P5 | P6 | P7 | P8 |
|---|---|---|---|---|---|---|---|---|
| X, mm | 10.5 | 10.5 | 11.1 | 11.1 | 1.7 | 1.7 | 11.7 | 16.7 |
| Y, mm | −10.5 | 10.5 | −11.1 | 10.5 | −1.7 | 1.7 | 11.1 | 16.7 |

| Beam | B1 | B2 |
|---|---|---|
| Width, mm | 0.8 | 0.8 |

These two tables provide point position and dimension data for the resonator model described in FIG. 10. The planar resonator geometry is defined for a 500 micron silicon wafer.

| Point | P1 | P2 | P3 | P4 | P5 | P6 | P7 | P8 |
|---|---|---|---|---|---|---|---|---|
| X, mm | 3.55 | 4.25 | 10 | −10 | 10 | 3.55 | 4.25 | 3.9 |
| Y, mm | 0 | 0 | 0 | −10 | 10 | −3.55 | 3.55 | 0 |

| Beam | B1 | B2 |
|---|---|---|
| Width, mm | 0.5 | 0.5 |

5.0 Exemplary Design Approach of an Isolated Resonator Gyroscope

A practical reactionless design can be determined by considering a three-body lumped parameter model of the proof mass 102 (e.g., an elongated post), counterbalancing plate 104 and central baseplate 106. From this model, a reactionless differential rocking mode is produced by matching the rocking frequency of vibration of the proof mass 102 with the baseplate 106 fixed, $\omega_1$, to the rocking frequency of the counterbalancing plate 104 with the baseplate 106 fixed, $\omega_2$. A baseplate inertia comparable to that of the resonator can produce a substantial separation of the common and differential modes. Minimizing thickness of the baseplate minimizes coupling of the common mode to the package. With this condition, there results a differential rocking mode with no baseplate 106 motion and a common rocking mode with large baseplate 106 motion and a large separation in the two rocking frequencies. With large baseplate 106 inertia, the undesirable common mode rocking frequency will be too close for practical control. Additionally, if the two frequencies are not very precisely matched, there will be baseplate 106 motion and energy transfer from the resonator 124 proportional to baseplate 106 inertia.

The planar counterbalancing plate 104 inertia generally matches the post proof mass 102 rocking inertia. Both can be fabricated from polished crystal silicon so that their inertias can be set equal by geometric design. Differential rocking of the post proof mass 102 against the planar counterbalancing plate 104 provides the two desirable degenerate, reactionless modes of vibration for sensing inertial rate with high mechanical gain. The high angular gain of the elongated post proof mass 102 versus the counterbalancing plate 104 provides a high sensitivity to Coriolis force and hence inertial rate sensing normal to the X-Y plane. The baseplate 106 carries the short pillars (e.g., 15–25 micron) for attachment of the resonator flexures 108 and provision of the capacitance gap 132 (see FIG. 2) for baseplate elements to drive and sense the vibration of the planar counterbalancing plate 104 of the resonator 124. The baseplate 106 can also include the integral isolation flexures 130 and an outer mounting plate 128 for packaging as previously described.

The present invention is applicable to navigation grade vibratory gyroscopes in rugged environments. The isolation of the two rocking modes from rigid baseplate motion ensures that modal damping and associated gyroscope rate drift will be determined primarily by the losses within the precision machined silicon resonator and not by the much less precise external packaging losses. The inherent high Q of bulk crystal silicon and the excellent symmetry which has been demonstrated through photolithography of precision double-side polished silicon wafers at mesoscale can be exploited with the present invention to achieve excellent navigation grade vibratory gyroscope performance at low cost.

In addition, other modes of implementation are also possible in which the flexures are not necessarily discrete but rather built into the counterbalancing plate 104 and baseplate elements of the proof mass. The essential requirement is that there be substantially no net reaction or momentum transfer to the baseplate.

It should also be understood that to achieve the full potential of low drift and noise performance using this isolated resonator principle will require even higher final 3D mechanical precision than afforded by the precise wafer polishing, through-etched silicon micromachining and high quality silicon bonding outlined above. This can be preferably accomplished with this design by focused ion beam trimming, after the assembly of the resonator onto its baseplate, of the dimensions of the elastic beam elements or the mass elements of the resonator, e.g. plate or post. This post-assembly trimming can take advantage of the highly sensitive built in capacitive sensors to increase the degree of initial isolation and tuning to subatomic precision.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A resonator gyroscope, comprising:
an isolated resonator;
one or more flexures for supporting the isolated resonator;
a baseplate affixed to the resonator by the one or more flexures;
drive and sense elements affixed to the baseplate for exciting the resonator sensing movement of the gyroscope; and
at least one secondary element affixed to the baseplate for trimming isolation of the resonator;
wherein the isolated resonator transfers substantially no net momentum to the baseplate when the resonator is excited.

2. The resonator gyroscope of claim 1, wherein the at least one secondary element comprises an electrode.

3. The resonator gyroscope of claim 1, wherein the at least one secondary element provides electrostatic control of a differential rocking mode of the isolated resonator.

4. The resonator gyroscope of claim 1, wherein the isolated resonator comprises a proof mass and a counterbalancing plate.

5. The resonator gyroscope of claim 4, wherein the counterbalancing plate and proof mass each have a center of mass and transverse inertia symmetry about an axis that are substantially coincident and together form two differential rocking modes of vibration transverse to the axis with substantially equal frequencies.

6. The resonator gyroscope of claim 4, wherein the proof mass comprises a vertical portion attached to a support plate portion elastically connected to the counterbalancing plate.

7. The resonator gyroscope of claim 6, wherein the vertical portion comprises a post attached to the support plate portion.

8. The resonator gyroscope of claim 6, wherein the isolation of the resonator is adjustable and varies according to a length of the vertical portion.

9. The resonator gyroscope of claim 6, wherein the at least one secondary element reacts with the support plate portion.

10. The resonator gyroscope of claim 4, wherein the sense and drive elements are disposed to react with the counterbalancing plate.

11. The resonator gyroscope of claim 10, wherein the counterbalancing plate includes an extensive planar region for reacting against the sense and drive elements.

12. The resonator gyroscope of claim 4, wherein the one or more flexures are arranged around a perimeter of the proof mass, each with a first end attached to the counterbalancing plate and a second end attached to the proof mass.

13. The resonator gyroscope of claim 4, further comprising a mounting plate attached to the baseplate through at least one mounting plate flexure.

14. A method, comprising the steps of: providing an isolated resonator;
supporting the isolated resonator with one or more flexures;
affix drive and sense electrodes to the baseplate for exciting the resonator and movement of the gyroscope;
affix at least one secondary element for trimming isolation of the resonator; and
affixing a baseplate to the resonator by the one or more flexures;
wherein the isolated resonator transfers substantially no net momentum to the baseplate when the resonator is excited.

15. The method of claim 14, wherein the at least one secondary element comprises an electrode.

16. The method of claim 14, wherein the at least one secondary element comprises a secondary electrode and provides electrostatic control of a differential mode of the isolated resonator.

17. The method of claim 14, wherein the isolated resonator comprises a proof mass and a counterbalancing plate.

18. The method of claim 17, wherein the counterbalancing plate and proof mass each have a center of mass and transverse inertia symmetry about an axis are substantially coincident and together form two differential rocking modes of vibration transverse to the axis with substantially equal frequencies.

19. The method of claim 17, wherein the proof mass comprises a vertical portion attached to a support plate portion elastically connected to the counterbalancing plate.

20. The method of claim 19, wherein the vertical portion comprises a post attached to the support plate portion.

21. The method of claim 19, wherein the resonator is isolated by changing a length of the vertical portion.

22. The method of claim 19, wherein the at least one secondary element reacts with the support plate portion.

23. The method of claim 17, wherein the sense and drive elements are disposed to react with the counterbalancing plate.

24. The method of claim 23, wherein the counterbalancing plate includes an extensive planar region for reacting against the sense and drive elements.

25. The method of claim 17, wherein the one or more flexures are arranged around a perimeter of the proof mass, each with a first end attacked to the counterbalancing plate and a second end attached to the proof mass.

26. The method of claim 17, further comprising a mounting plate attached to the baseplate through at least one mounting plate flexure.

* * * * *